United States Patent
Bhatnagar et al.

(10) Patent No.: US 8,080,486 B1
(45) Date of Patent: Dec. 20, 2011

(54) BALLISTIC SHIELD COMPOSITES WITH ENHANCED FRAGMENT RESISTANCE

(75) Inventors: Ashok Bhatnagar, Richmond, VA (US); Brian D. Arvidson, Chester, VA (US); Henry G. Ardiff, Chesterfield, VA (US); David A. Hurst, Richmond, VA (US); Terry S. Chern, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/845,429

(22) Filed: Jul. 28, 2010

(51) Int. Cl.
*B32B 27/04* (2006.01)

(52) U.S. Cl. ........................................ 442/134

(58) Field of Classification Search .............. 2/2.5, 455, 2/462, 402; 442/134, 135, 320, 323, 326, 442/381, 394, 399; 428/112, 911; 89/36.05
See application file for complete search history.

(56) References Cited

U.S. PATENT DOCUMENTS

| | | | |
|---|---|---|---|
| 3,671,542 A | 6/1972 | Kwolek | |
| 4,137,394 A | 1/1979 | Meihuizen et al. | |
| 4,181,768 A | 1/1980 | Severin | |
| 4,356,138 A | 10/1982 | Kavesh et al. | |
| 4,403,012 A | 9/1983 | Harpell et al. | |
| 4,413,110 A | 11/1983 | Kavesh et al. | |
| 4,457,985 A | 7/1984 | Harpell et al. | |
| 4,510,301 A | 4/1985 | Levy | |
| 4,544,721 A | 10/1985 | Levy | |
| 4,613,535 A | 9/1986 | Harpell et al. | |
| 4,623,574 A * | 11/1986 | Harpell et al. | 428/113 |
| 4,650,710 A | 3/1987 | Harpell et al. | |
| 4,737,402 A | 4/1988 | Harpell et al. | |
| 4,748,064 A | 5/1988 | Harpell et al. | |
| 5,139,878 A | 8/1992 | Kim et al. | |
| 5,165,989 A | 11/1992 | Bhatnagar et al. | |
| 5,343,796 A | 9/1994 | Cordova et al. | |
| 5,552,208 A | 9/1996 | Lin et al. | |
| 5,587,230 A | 12/1996 | Lin et al. | |
| 5,702,657 A | 12/1997 | Yoshida et al. | |
| 5,783,625 A | 7/1998 | Mori et al. | |
| 6,127,469 A | 10/2000 | Grimm | |
| 6,475,936 B1 | 11/2002 | Chiou | |
| 6,534,426 B1 | 3/2003 | Chiou | |
| 6,548,604 B1 | 4/2003 | Kotsuji et al. | |

(Continued)

FOREIGN PATENT DOCUMENTS

CA 1190343 7/1985

(Continued)

OTHER PUBLICATIONS

Thomas, H.L. et al.; "Needle-punched Non-woven Fabric for Fragmentation Protection"; 14th International Conference on Composite Materials, Jul. 14-18, 2003, San Diego, California.

*Primary Examiner* — Arti Singh-Pandey
(74) *Attorney, Agent, or Firm* — Banner & Witcoff, Ltd.

(57) ABSTRACT

Consolidated, layered composites having high penetration resistance to both bullets and fragments are described. The composites comprise, in order, a first non-woven fabric comprising one or a plurality of unidirectionally oriented high tenacity fibrous layers, a felt material comprising high tenacity felt fibers, and a second non-woven fabric comprising one or a plurality of unidirectionally oriented high tenacity fibrous layers. The non-woven fabrics and intermediate felt material are consolidated at facing lateral surfaces.

20 Claims, 1 Drawing Sheet

U.S. PATENT DOCUMENTS

| | | |
|---|---|---|
| 6,642,159 B1 | 11/2003 | Bhatnagar et al. |
| 6,841,492 B2 | 1/2005 | Bhatnagar et al. |
| 6,846,758 B2 | 1/2005 | Bhatnagar et al. |
| 7,030,193 B2 | 4/2006 | Guerin et al. |
| 7,073,538 B2 | 7/2006 | Bhatnagar et al. |
| 7,288,307 B2 | 10/2007 | Bhatnagar et al. |
| 7,288,493 B2 | 10/2007 | Bhatnagar et al. |
| 7,600,537 B2 | 10/2009 | Bhatnagar et al. |
| 7,601,654 B2 | 10/2009 | Bhatnagar et al. |
| 7,622,405 B1 | 11/2009 | Arvidson et al. |
| 7,629,277 B2 | 12/2009 | Bhatnagar et al. |
| 7,642,206 B1 | 1/2010 | Bhatnagar et al. |
| 7,687,412 B2 | 3/2010 | Bhatnagar et al. |
| 7,718,245 B2 | 5/2010 | Bhatnagar et al. |
| 7,762,175 B1 | 7/2010 | Bhatnagar et al. |
| 2002/0106956 A1 | 8/2002 | Howland |
| 2003/0022583 A1 | 1/2003 | Thomas et al. |
| 2003/0199215 A1 | 10/2003 | Bhatnagar et al. |
| 2003/0228815 A1 | 12/2003 | Bhatnagar et al. |
| 2004/0237763 A1 | 12/2004 | Bhatnagar et al. |
| 2005/0153098 A1 | 7/2005 | Bhatnagar et al. |
| 2007/0062595 A1 | 3/2007 | Bhatnagar et al. |
| 2007/0117483 A1 | 5/2007 | Bhatnagar et al. |
| 2007/0173150 A1 | 7/2007 | Bhatnagar et al. |
| 2007/0194490 A1 | 8/2007 | Bhatnagar et al. |
| 2007/0238379 A1 | 10/2007 | Bhatnagar et al. |
| 2007/0293109 A1 | 12/2007 | Bhatnagar et al. |
| 2008/0064280 A1 | 3/2008 | Bhatnagar et al. |
| 2008/0118639 A1 | 5/2008 | Arvidson et al. |
| 2008/0119098 A1 | 5/2008 | Palley et al. |
| 2008/0139071 A1 | 6/2008 | Bhatnagar et al. |
| 2008/0237911 A1 | 10/2008 | Ardiff et al. |
| 2008/0241494 A1 | 10/2008 | Ardiff et al. |
| 2009/0025111 A1 | 1/2009 | Bhatnagar et al. |
| 2009/0163105 A1 | 6/2009 | Ardiff et al. |
| 2009/0269583 A1 | 10/2009 | Bhatnagar et al. |
| 2009/0297816 A1 | 12/2009 | Arvidson et al. |
| 2010/0015406 A1 | 1/2010 | Bhatnagar et al. |
| 2010/0170386 A1 | 7/2010 | Bhatnagar et al. |
| 2010/0239374 A1 | 9/2010 | Davis et al. |
| 2010/0239810 A1 | 9/2010 | Bhatnagar et al. |

FOREIGN PATENT DOCUMENTS

| | | | |
|---|---|---|---|
| GB | 2051667 A | | 1/1981 |
| WO | WO 2006/124825 | * | 11/2006 |

* cited by examiner

BALLISTIC SHIELD COMPOSITES WITH ENHANCED FRAGMENT RESISTANCE

FIELD OF THE INVENTION

The present invention relates to consolidated, layered composites having high penetration resistance to both bullets and fragments. The composites comprise both non-woven fabrics, each having one or more unidirectionally oriented high tenacity fibrous layers, and a felt material comprising high tenacity fibrous layers.

DESCRIPTION OF RELATED ART

Ballistic resistant articles containing high strength fibers that have excellent properties against deformable projectiles are known. These articles, including bulletproof vests, helmets, and structural components of military equipment, are typically made from fabrics having layers of high strength fibers. Fibers conventionally used include polyethylene fibers, para-aramid fibers (e.g., poly(phenylenediamine terephthalamide)), graphite fibers, nylon fibers, glass fibers, etc. For many applications, such as vests or parts of vests, the fibers may be used in a woven or knitted fabric. For other applications, the fibers are encapsulated or embedded in a matrix material to form either rigid or flexible fabrics.

Specific ballistic resistant articles, including vests, helmets, and panels, are described, for example, in U.S. Pat. No. 4,403,012; U.S. Pat. No. 4,457,985; U.S. Pat. No. 4,613,535; U.S. Pat. No. 4,623,574; U.S. Pat. No. 4,650,710; U.S. Pat. No. 4,737,402; U.S. Pat. No. 4,748,064; U.S. Pat. No. 5,552,208; U.S. Pat. No. 5,587,230; U.S. Pat. No. 6,642,159; U.S. Pat. No. 6,841,492; and U.S. Pat. No. 6,846,758. In particular, these patents describe ballistic resistant composites that include high strength fibers such as extended chain ultra-high molecular weight polyethylene fibers. These composites display varying degrees of resistance to penetration by high speed impact from projectiles such as bullets. U.S. Pat. No. 4,403,012 and U.S. Pat. No. 4,457,985 disclose ballistic-resistant composites having networks of high molecular weight polyethylene or polypropylene fibers, as well as matrices of olefin polymers and copolymers, unsaturated polyesters, epoxies, and other polymers moldable below the melting point of the fiber.

U.S. Pat. No. 4,623,574 and U.S. Pat. No. 4,748,064 disclose composites comprising high strength fibers embedded in an elastomeric matrix. U.S. Pat. No. 4,737,402 and U.S. Pat. No. 4,613,535 disclose rigid composites having good impact resistance and comprising a network of high strength fibers such as the ultra-high molecular weight polyethylene and polypropylene fibers, as disclosed in U.S. Pat. No. 4,413,110. The fibers are embedded in an elastomeric matrix material and at least one additional rigid layer on a major surface of the fibers in the matrix. U.S. Pat. No. 4,650,710 discloses a flexible article having a plurality of flexible layers comprising high strength, extended chain polyolefin (ECP) fibers. The fibers are coated with a low modulus elastomeric material.

U.S. Pat. No. 5,552,208 and U.S. Pat. No. 5,587,230 disclose articles comprising at least one network of high strength fibers and a matrix composition that includes a vinyl ester and diallyl phthalate. U.S. Pat. No. 6,642,159 discloses an impact resistant rigid composite having a plurality of fibrous layers. The layers have a network of filaments disposed in a matrix, and elastomeric layers are between the fibrous layers. The composite is bonded to a hard plate to increase protection against armor piercing projectiles. U.S. Pat. No. 6,841,492 discloses bi-directional and multi-axial fabrics, fabric composites, ballistically resistant assemblies thereof and the methods by which they are made. The fabrics include sets of strong, substantially parallel, unidirectional yarns lying in parallel planes, one above the other. U.S. Pat. No. 6,846,758 discloses woven fabric laminates having superior resistance to penetration by ballistic projectiles. The laminates include a fabric woven from a high strength, high modulus yarn, a surface coating of a low modulus elastomer and a plastic film bonded to its elastomer-coated surface.

Articles having a high resistance to penetration of fragments, such as shrapnel, are also known to include high strength fibers made from materials such as high molecular weight polyethylene, aramids, and polybenzazoles. These articles are described, for example, in U.S. Pat. Nos. 6,534,426 and 6,475,936, as well as "Lightweight Composite Hard Armor Non Apparel Systems with T-963 3300 dtex DuPont Kevlar 29 Fibre," published in 1984 by E.I. duPont De Nemours International S.A. Fibers in these articles may be woven or non-woven. Non-woven fibers may be knitted, uniaxially aligned and cross-plied, or felted. The articles can be flexible or rigid depending upon the nature of their construction and the materials employed.

U.S. Pat. No. 4,181,768 describes a rigid armor formed by press laminating alternate layers of 6,6 nylon film and poly-(p-phenylene terephthalamide) fabric. The fabric can be a non-woven material such as a needle-punched felt. U.S. Pat. No. 5,343,796 describes armor systems comprising a first pliable fibrous layer and a second pliable cut resistant fibrous layer. The second layer comprises an uncoated needle-punched felt. US 2002/0106956 describes fabric articles comprising at least two fiber types: one having a tenacity of at least 10 g/d and another having a tenacity of less than 10 g/d. The fabrics have a layer resistant to puncture by thorns, snake bites, sharp branches and the like, and may have a microporous membrane layer behind the puncture resistant layer. The puncture resistant layer can be a needle-punched felt.

US 2003/0022583 describes ballistic resistant fabrics comprising at least two types of fibrous materials blended and consolidated together to create a single layer of composite material. The fibrous materials are consolidated by needle punching and compression. H. L. Thomas, describes "Needle-punched Non-woven Fabric for Fragmentation Protection," in materials presented at the 14th International Conference on Composite Materials, Jul. 14-18, 2003, San Diego, Calif. US 2010/0015406 describes laminated felt sheets and assemblies thereof, having utility for impact absorption, ballistic resistance, and penetration resistance.

Each of the constructions cited above represents progress toward the goals to which they were directed. However, an ongoing problem associated with many conventional ballistic resistant fabrics and articles, such as vests, that are made with these fabrics is their limited resistance to the penetration of fragments, such as shrapnel from hand grenades and projectile fragments from other explosive devices. There is consequently a need in the art for ballistic resistant fabrics that can provide effective protection to military personnel and other users against both bullets and high energy fragments, thereby considerably enhancing their safety when confronted with dangerous and potentially life-threatening situations such as enemy fire.

SUMMARY OF THE INVENTION

The present invention is associated with the discovery of layered composites that overcome the performance disadvantages, discussed above, associated with conventional ballistic resistant fabrics in terms of their resistance to the penetration of fragments. Moreover, the layered composites also address the drawbacks of known fragment resistant materials such as felt, and in particular its bulkiness and tendency to absorb water and become heavy. Both of these characteristics present difficulties to the users, typically military and law enforcement personnel, who require high performance materials that provide not only good protection, but also high mobility/maneuverability and low weight.

Embodiments of the invention are directed to consolidated, layered composites having high penetration resistance to both bullets and fragments. The composites comprise, in order, a first non-woven fabric comprising one or a plurality of unidirectionally oriented high tenacity fibrous layers, a felt material comprising high tenacity felt fibers, and a second non-woven fabric comprising one or a plurality of unidirectionally oriented high tenacity fibrous layers. The non-woven fabrics and intermediate felt material are consolidated at facing lateral surfaces. In some cases, it may be desirable to incorporate one or more laminating film layers (e.g., comprising a resin selected from the group consisting of a polyethylene, a polyamide, a polycarbonate, an ionomer, and a polyester) between any facing lateral surfaces of the non-woven fabric and the felt material.

Other embodiments of the invention are directed to methods of making a layered composite. The method comprise consolidating (a) a first non-woven fabric comprising one or a plurality of unidirectionally oriented high tenacity fibrous layers, (b) a felt material comprising high tenacity felt fibers, and (c) a second non-woven fabric comprising one or a plurality of unidirectionally oriented high tenacity fibrous layers. Optionally, a laminating film layer is also consolidated between (a) and (b) and/or between (b) and (c) to provide the layered composite.

More particular embodiments of the invention are directed to articles (e.g., vests) having high penetration resistance to both bullets and fragments. The articles comprise a consolidated, layered composite comprising a felt material comprising high tenacity felt fibers, and further comprising first and second non-woven fabrics adjacent each opposing lateral surface of the felt material. The first and second non-woven fabrics each comprise one or a plurality of high tenacity fibrous layers. In the case of a plurality of layers in one or both of the non-woven fabrics, these may be in a cross-ply arrangement of unidirectionally oriented fibers with adjacent layers of fibers extending in a direction of 90° relative to one another. In any case, the felt material and non-woven fabrics may be consolidated at facing lateral surfaces. In other particular embodiments, either or both of the first and second non-woven fabrics may comprise only a single high tenacity fibrous layer. In a specific embodiment, first and second non-woven fabrics, adjacent opposing lateral surfaces of the felt material, each comprise a single high tenacity fibrous layer, with the fibers of these layers oriented or extending in different directions (e.g., extending in a direction of 45° or 90° relative to one another).

These and other embodiments and aspects of the invention, and their associated advantages, are apparent from the following Detailed Description.

BRIEF DESCRIPTION OF THE DRAWING

The features of the FIGURE are not necessarily drawn to scale and should be understood to present an illustration of the invention and/or principles involved. Other composites and articles made from these composites, according to other embodiments of the present invention, will have components and configurations determined in part by the intended application and environment in which they are used.

DETAILED DESCRIPTION

Figure 1:
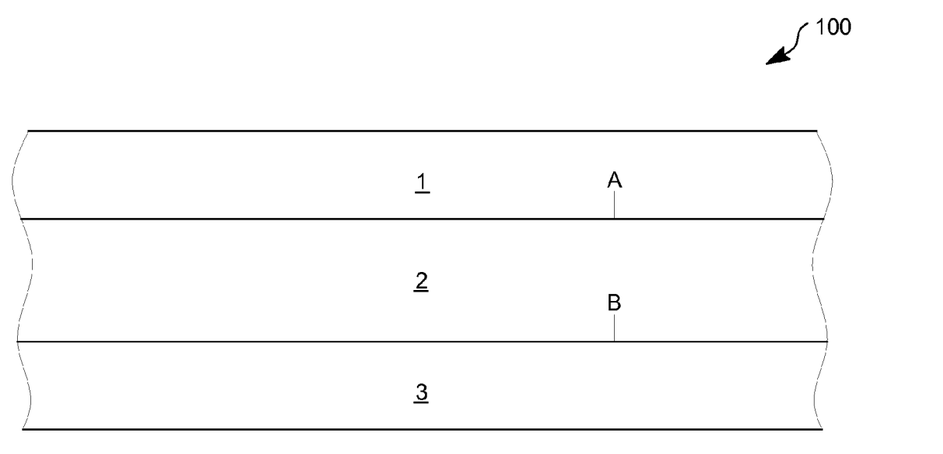
The FIGURE depicts a representative, cut-out view of a composite according to an exemplary embodiment of the present invention.

As discussed above, the invention is associated with consolidated composites having high penetration resistance to bullets and fragments. In addition to these performance characteristics, the composites have significant advantages when used in military, law enforcement, or other applications where weight, thickness, and water resistance are of great importance to the user. Representative layered composites comprise a felt material, comprising high tenacity fibers, between first and second non-woven fabrics, each comprising one or a plurality of high tenacity fibrous layers. The composite may therefore comprise layers, in order, of the first, non-woven fabric, the felt material, and the second non-woven fabric. The high tenacity fibrous layers of the first and second non-woven fabrics may comprise the same high tenacity fibers (e.g., polyethylene fibers) or different fibers. Also, the felt material may comprise the same high tenacity fibers as either or both of the non-woven fabrics, or otherwise a different fiber.

High Tenacity Fibers and Fibrous Layers

Each of the first and second non-woven fabrics of the consolidated composites described herein, which have a felt material disposed between these fabrics, comprises one or a plurality of fibrous layers of high tenacity fibers. The felt material itself also comprises high tenacity fibers. For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments. A "layer" is a body that may be rigidly or flexibly curved in three dimensions, but if laid flat in a plane, would have length and width dimensions much greater than a thickness dimension.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material. Preferably, the high tenacity fibers have tenacities equal to or greater than about 10 g/d, more preferably equal to or greater than about 15 g/d, even more preferably equal to or greater than about 20 g/d, and most preferably equal to or greater than about 30 g/d. For high tenacity polyethylene fibers, the preferred tenacities range from about 20 to about 55 g/d. Preferably, at least about 50% by weight, and more preferably at least about 75% by weight, of the fibers in the plurality of fibrous layers of both of the first and second non-woven fabrics are high tenacity fibers. Most preferably all or substantially all of the fibers in the plurality of fibrous layers of both non-woven fabrics are high tenacity fibers.

The cross-sections of fibers useful in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the fibers be of substantially circular, flat or oblong cross-section, most preferably that the fibers be of substantially circular cross-section. The yarns of fibers such as high tenacity fibers used herein may be of any suitable denier, such as, for example, about 50 to about 5000 denier, more preferably from about 200 to about 5000 denier, still more preferably from about 650 to about 3000 denier, and most preferably from about 800 to about 1500 denier.

High tenacity fibers such as polyolefin fibers or aramid fibers are representative of those used in the fibrous layers of the first and second non-woven fabrics. Polyolefin fibers are preferably high tenacity polyethylene fibers and/or high tenacity polypropylene fibers. Most preferably, the polyolefin fibers are high tenacity polyethylene fibers, also known as extended chain polyethylene fibers or highly oriented high molecular weight polyethylene fibers. The polyolefin and aramid fibers useful herein are known and possess excellent ballistic resistant properties.

U.S. Pat. No. 4,457,985 generally discusses high molecular weight polyethylene fibers and polypropylene fibers. In the case of polyethylene fibers, suitable fibers are those of weight average molecular weight of at least about 150,000, preferably at least about one million and more preferably between about two million and about five million. Such high molecular weight polyethylene fibers may be spun in solution, as described, for example, in U.S. Pat. No. 4,137,394 and U.S. Pat. No. 4,356,138. The fibers may otherwise comprise filaments spun from a solution to form a gel structure, as described, for example, in U.S. Pat. No. 4,413,110, German Off. No. 3,004,699 and GB Patent No. 2051667). In an alternate embodiment, the polyethylene fibers may be produced by a rolling and drawing process, as described, for example, in U.S. Pat. No. 5,702,657. As used herein, the term polyethylene means a predominantly linear polyethylene material that may contain minor amounts of chain branching or comonomers not exceeding about 5 modifying units per 100 main chain carbon atoms, and that may also contain admixed therewith not more than about 50 weight percent of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers are commercially available and are sold under the trademark SPECTRA® fiber by Honeywell International Inc. of Morristown, N.J., U.S.A. Polyethylene fibers from other sources may also be used.

Depending upon the formation technique, the draw ratio and temperatures, and other conditions, a variety of properties can be imparted to these fibers. The tenacity of the polyethylene fibers is in particular at least about 7 g/d, preferably at least about 15 g/d, more preferably at least about 30 g/d, still more preferably at least about 35 g/d and most preferably at least about 45 g/d. Similarly, the initial tensile modulus of the polyethylene fibers, as measured by an Instron tensile testing machine, is preferably at least about 300 g/d, more preferably at least about 500 g/d, still more preferably at least about 1,000 g/d and most preferably at least about 1,800 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. (280° F.). The highly oriented polyethylene filaments made of these materials have melting points of from about 7° C. (13° F.) to about 13° C. (23° F.) higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity for polyethylene fibers is preferably at least about 8 g/d, more preferably at least about 11 g/d. The initial tensile modulus for polypropylene is preferably at least about 160 g/d, and more preferably at least about 200 g/d. The melting point of the polypropylene is generally raised several degrees by the orientation process, such that the polypropylene filament preferably has a main melting point of at least 168° C. (334° F.), and more preferably at least 170° C. (338° F.). Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671,542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 28 g/d, a modulus of at least about 1000 g/d and an energy-to-break of at least about 30 J/g. For example, poly(p-phenylene terephthalamide) filaments which have moderately high moduli and tenacity values are particularly useful in forming ballistic resistant composites. Examples are DuPont's KEVLAR®29, KEVLAR®129, and KM2 (available in 400, 640 and 840 deniers) and Teijin's TWARON® fibers type 1000 and 2000 (having a denier of 1000), HERACRON® fibers from Kolon Industries, Inc., and a number of fibers produced commercially by Kamensk Volokno JSC and JSC Chim Volokno of Russia, such as RUSAR™, ARTEC™, ARMOS™, and SVM™ which have about 1250 g/d and 32 g/d as values of initial tensile modulus and tenacity, respectively. Other examples are KEVLAR®129 and KM2 from du Pont, and TWARON®T2000 from Teijin Aramid fibers from other manufacturers can also be used in this invention. Copolymers of poly(p-phenylene terephthalamide) (e.g., co-poly(p-phenylene terephthalamide 3,4' oxydiphenylene terephthalamide)) may also be suitable. Also useful are poly (m-phenylene isophthalamide) fibers sold by DuPont under the trade name NOMEX®. Aramid fibers from a variety of suppliers may also be employed.

Non-Woven Fabrics

Regardless of the type of high tenacity fibers used, including any of the polyolefin and/or aramid fibers described above, the fibrous layers of the first and second fabrics of the consolidated, layered composites described herein are incorporated into non-woven fabrics, such as in plies of unidirectionally oriented fibers. In this case, the layers or plies of unidirectionally oriented fibers are preferably used in a cross-ply arrangement in which one layer of fibers extends in one direction and a second layer of fibers extends in a direction 90° from the first fibers. Where the individual plies are unidirectionally oriented fibers, the successive plies are preferably rotated relative to one another, for example at angles of 0°/90°, 0°/90/0°/90 or 0°/45°/90°/45°/0° or at other angles. In a preferred embodiment, if a plurality of fibrous layers is used in one or both of the first and second non-woven fabrics, the layers may be in a cross-ply arrangement of unidirectionally oriented fibers, with adjacent layers of fibers extending in a direction of 90° relative to one another. In other embodiments, layers of fibers adjacent opposing lateral surfaces of the felt material may likewise extend in a direction of 90° relative to one another, or at some other direction (e.g., 45°) that provides an offset between the layers. The felt material may, for example, be sandwiched, optionally with laminating film layers on either or both opposing surfaces of the felt material, between first and second non-woven fabrics, each comprising a single fibrous layer having fibers extending in a direction of 90° relative to one another.

The number of fibrous layers of the first and second non-woven fabrics may vary widely, depending on the desired performance and the desired weight. For example, the number of layers may range generally from about 2 to about 100 layers, and often from about 2 to about 10 layers. In a more specific embodiment, the first and second non-woven fabrics each comprise from about 2 to about 8 fibrous layers. Otherwise, either or both of non-woven fabrics may comprise only a single layer. The fibrous layers may be of any suitable thickness, and the thickness of each layer of the plurality of fibrous layers may be the same or may vary. Likewise, the areal density of each layer of the plurality of fibrous layers of the first and/or second fabrics may vary widely but these are usually chosen so that the overall weight of the consolidated, layered composite is within an acceptable range for both the protection and comfort of the wearer.

Felt Material

The high tenacity fibers, as described above, of the fibrous material that is incorporated between the first and second non-woven fabrics are felted, thereby forming a felt material. A single type of high tenacity fiber may be used for the felt material, or blends of two or more different fibers may be used, for example a blend of two high tenacity fibers (e.g., polyolefin fibers and aramid fibers) or a blend of a high tenacity fiber and other type of fiber. The type(s) of fibers, as a single fiber or blend used for the felt material may be, for example, chopped fibers. In the case of a blend, two or more fiber types may be blended uniformly, as in the case of a hybrid fiber felt, or they may be blended non-uniformly, for example, with one fiber type disposed predominantly in a first felt fiber layer and a second fiber type disposed predominantly in a second felt fiber layer. A felt is a non-woven network of randomly oriented fibers, preferably at least one of which is a discontinuous fiber, preferably a staple fiber having a length ranging from about 0.64 cm (0.25 in) to about 25 cm (10 in). These felts may be formed by several techniques known in the art, such as by carding or fluid laying, melt blowing and spin laying. The network of fibers is consolidated mechanically such as by needle punching, stitch-bonding, hydro-entanglement, air entanglement, spun bond, spun lace or the like, chemically such as with an adhesive, or thermally with a fiber to point bond or a blended fiber with a lower melting point. The preferred consolidation method is needle punching alone or followed by one of the other methods. The preferred felt is a needle punched felt. A felt that is needle punched into woven fabric may also be used.

Needle punching is a process by which webs of loose fibers are converted into a coherent non-woven fabric by mechanical entanglement on machinery called needle looms. Needle looms are manufactured, for example, by the firms of Oskar Dilo Maschinenfabrik K G, Eberbach/N, Germany, Ferher A G, Linz, Austria and Asselin, Elbeuf, France. During needle punching, barbed needles punch fiber into the web and withdraw leaving the fibers entangled. By varying the strokes per minute, the advance rate of the web, and the weight of the web, a wide range of felt densities are possible.

The felt material of the layered composite is preferably produced from a web having an areal density generally from about 0.034 kg/m$^2$ (0.0070 lb/ft$^2$) to about 1.67 kg/m$^2$ (0.34 lb/ft$^2$), typically from about 0.068 (0.014 lb/ft$^2$) to about 0.68 kg/m$^2$ (0.14 lb/ft$^2$) and often from about 0.136 kg/m$^2$ (0.028 lb/ft$^2$) to about 0.34 kg/m$^2$ (0.070 lb/ft$^2$). Generally, the needle punch density is from about 15.5 to about 310 punches/cm$^2$ (about 100 to about 2000 punches/in$^2$) of web, and typically from about 31 to about 155 punches/cm$^2$ (about 200 to about 1000 punches/in$^2$).

Resin Matrix

The high tenacity fibers of the fibrous layers (or fiber plies) of the first and second non-woven fabrics, as well as the high tenacity fibers of the felt material (e.g., high tenacity polyethylene fibers or high tenacity aramid fibers) may be in a resin matrix. The resin matrix for the fibers, whether in plies in the first and second non-woven fabrics or randomly oriented in the felt material, may be formed from a wide variety of elastomeric and other materials having desired characteristics. In one embodiment, elastomeric materials used in such resin matrix possess initial tensile modulus (modulus of elasticity) equal to or less than about 41.4 MPa (6,000 psi) as measured by ASTM D638. More preferably, the elastomer has initial tensile modulus equal to or less than about 16.5 MPa (2,400 psi). Most preferably, the elastomeric material has initial tensile modulus equal to or less than about 8.23 MPa (1,200 psi). The resin matrix may be selected to have a high tensile modulus when cured, such as at least about $10^6$ psi (6895 MPa) as measured by ASTM D638. Examples of such materials are disclosed, for example, in U.S. Pat. No. 6,642,159. These resin matrix typically thermoplastic in nature but thermosetting materials are also useful.

The proportion of the resin matrix material to fiber in either the fibrous layers of the first and second non-woven fabrics or the felt material may vary widely depending upon the end use. The resin matrix material preferably comprises about 0 percent (i.e., no resin) to about 98 percent by weight, more preferably from about 5 to about 95 percent by weight, still more preferably from about 5 to about 40 percent by weight, and most preferably from about 15 to about 25 percent by weight, of the total weight of the fibers and resin matrix, whether the fibers are in the non-woven fabrics or in the felt material. The above percentages are based on the consolidated layered composites.

A wide variety of resins may be utilized in the resin matrix, including thermoplastic resins, thermosetting resins, blended resins, and hybrid resins. For example, any of the following materials may be employed: polybutadiene, polyisoprene, natural rubber, ethylene-propylene copolymers, ethylene-propylene-diene terpolymers, polysulfide polymers, thermoplastic polyurethanes, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenolic resins such as phenol formaldehyde, polyvinyl butyral, epoxy resins, polyester resins, polyurethane resins, and mixtures thereof, and the like. Included are those resins that are disclosed in the aforementioned U.S. Pat. No. 6,642,159. Preferred thermosetting resins include epoxy resins, phenolic resins, vinyl ester resins, urethane resins and polyester resins, and mixtures thereof. Preferred thermosetting resins for polyethylene fiber fabrics include at least one vinyl ester, diallyl phthalate, and optionally a catalyst for curing the vinyl ester resin.

One preferred group of resins are thermoplastic polyurethane resins. A preferred group of elastomeric materials for the resin matrix includes block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type R-(BA)$_x$ (x=3-150); wherein A is a block from a polyvinyl aromatic monomer and B is a block from a conjugated diene elastomer. A preferred resin matrix is an isoprene-styrene-isoprene block copolymer, such as Kraton® D1107 isoprene-styrene-isoprene block copolymer available from Kraton Polymer LLC. Another resin matrix useful herein is a thermoplastic polyurethane, such as a copolymer mix of polyurethane resins in water.

Types of resin matrix that may be disposed on the fibrous layers of the first and/or second non-woven fabrics, and preferably on high tenacity fibers of the felt material, include nitrile rubber polymers that are resistant to dissolution, penetration and/or transpiration by water and organic solvents. According to particular embodiments, therefore, composites described herein comprise a nitrile rubber polymer disposed on the high tenacity fibers of the felt material and/or the fibrous layers of the first and/or second non-woven fabrics. In a preferred embodiment, the nitrile rubber polymer is present in the felt material in an amount from about 2% to about 50% of the combined weight of the resin matrix and the fibers.

Nitrile rubber polymers are preferably uncured (non-crosslinked). Cured or crosslinked nitrile rubbers have a higher modulus than uncured nitrile rubbers and, accordingly, are stiffer than uncured materials. Nitrile rubber polymers are particularly desirable because they achieve the desired resistance to water, e.g., salt water and organic solvents such as gasoline, while imparting good peel strength and flexibility to the consolidated composite, both of which are indications of excellent durability. Nitrile rubber polymers are a family of unsaturated copolymers of acrylonitrile and butadiene and many different types are available having different properties. For example, the desired resistance to organic solvents such as oil and gasoline may be controlled and balanced with other properties, such as resistance to extreme temperatures, by regulating the acrylonitrile content of the nitrile rubber versus the butadiene content. Due to its polarity, a nitrile rubber having a higher acrylonitrile content has better resistance to oils and gasoline, and also increased tensile strength, relative to nitrile rubbers with lower acrylonitrile content. Nitrile rubbers having a lower acrylonitrile content also exhibit good resistance to oils and gasoline (although not as good as high acrylonitrile content polymers), as well as excellent flexibility and resilience, while high acrylonitrile content polymers exhibit higher stiffness and lower flexibility. The acrylonitrile and butadiene can be varied depending on the type of ballistic resistant fabric desired. In general, the nitrile rubber polymer (or the nitrile rubber component of the resin matrix) has an acrylonitrile content of from about 15% to about 50% by weight.

In representative embodiments, the nitrile rubber polymers comprise nitrile rubber terpolymers comprising an acrylonitrile monomer, a butadiene monomer, and another monomer component, such as N-methylol acrylamide or a carboxylic acid, such as methacrylic acid. Preferably the nitrile rubber comprises a carboxylated nitrile rubber (XNBR) terpolymer. A preferred XNBR terpolymer preferably comprises from about 0.1% to about 20%, more preferably from about 1% to about 10%, and most preferably from about 1% to about 5%, by weight, of carboxylic acid monomer. These amounts are not intended to be limiting. Nitrile rubber polymers comprising carboxylated nitrile rubber are preferred because they produce fabrics having outstanding abrasion resistance and excellent strength. Such terpolymers are well known in the art and are commercially available, for example, from Dow Reichhold Specialty Latex, LLC. of Research Triangle Park, N.C., under the trademark TYLAC®68073. Useful carboxylated nitrile rubber terpolymers are also described, for example, in U.S. Pat. No. 6,127,469; U.S. Pat. No. 6,548,604; and U.S. Pat. No. 7,030,193. Another preferred terpolymer comprises an acrylonitrile monomer, a butadiene monomer and N-methylol acrylamide (NMA). One example of this type of terpolymer is HYCAR®1572×64, commercially available from Emerald Performance Materials of Akron, Ohio.

Other useful terpolymers of this type are described, for example, in U.S. Pat. No. 5,783,625 and Canadian patent CA 1190343. A preferred acrylonitrile/butadiene/NMA terpolymer preferably comprises from about 0.3% to about 10%, more preferably from about 1% to about 10%, and most preferably from about 2% to about 4%, by weight of NMA monomer. U.S. Pat. No. 5,783,625 describes a useful range of self-crosslinking NMA monomer of between 0.3% and 10%. Canadian patent CA1190343 provides rubber compositions including (A) 10-90% by weight of a terpolymer consisting of a conjugated diolefin, an α, β-unsaturated nitrile and an α, β-unsaturated carboxylic ester, (B) 10-90% by weight of a sulfur-vulcanizable acrylic rubber and (C) 0-40% by weight of a copolymer consisting of a conjugated diolefin and an α, β-unsaturated nitrile having a combined α, β-unsaturated nitrile content of 10-60% by weight. This rubber composition has excellent processability, oil resistance and heat resistance.

Optionally, the nitrile rubber polymer may be hydrogenated to improve durability and environmental resistance. Particularly, hydrogenated nitrile rubbers (HNBR) have excellent mechanical, thermo-oxidative and chemical resistant properties and an excellent operating temperature range.

In another embodiment, the nitrile rubber polymer may comprise a blend of a nitrile rubber and a fluoropolymer and/or a fluorocarbon resin. It has been found that a nitrile rubber polymer comprising a blend of a nitrile rubber component and one or more fluorine-containing components has a significantly improved $V_{50}$ retention % after immersion in either salt water or gasoline, i.e., greater than or equal to 95% retention, compared to fabrics formed with neither nitrile rubber nor a fluorine-containing material. As used herein, a "fluorine-containing material" or "fluorine containing component" includes fluoropolymers and fluorocarbon-containing materials (i.e., fluorocarbon resins). A "fluorocarbon resin" generally refers to polymers including fluorocarbon groups. When blends are formed, no reaction takes place between the nitrile rubber polymer and the fluoropolymer/fluorocarbon resin. A copolymer is not formed, only a physical blend. It has also been recognized that the fluoropolymer/fluorocarbon resin, which will normally have a lower molecular weight than the nitrile rubber, tends to concentrate and organize itself at the boundaries, such as at the outer material/fabric surfaces (e.g., the air-to-rubber polymer interface (outside surface), and/or the fiber-to-rubber polymer interface (inside surface)). This distribution of the fluorocarbon resin at the surfaces increases its effectiveness in enhancing environmental resistance (e.g., to salt water, gasoline, etc.) of the composite. In this embodiment, the type of nitrile rubber is not limited and may comprise, for example, XNBR, HNBR or non-hydrogenated nitrile rubber.

The resin matrix may further comprise fluorine-containing resins, particularly fluoropolymers and fluorocarbon resin materials, which are commonly known for their excellent chemical resistance and moisture barrier properties. Useful fluoropolymer and fluorocarbon resin materials include fluoropolymer homopolymers, fluoropolymer copolymers or blends of these, as described in, for example, U.S. Pat. No. 4,510,301; U.S. Pat. No. 4,544,721; and U.S. Pat. No. 5,139,878. Examples of useful fluoropolymers include, but are not limited to, homopolymers and copolymers of chlorotrifluoroethylene, ethylene-chlorotrifluoroethylene copolymer, ethylene-tetrafluoroethylene copolymer, fluorinated ethylene-propylene copolymer, perfluoro alkoxyethylene, polychlorotrifluoroethylene, polytetrafluoroethylene, polyvinyl fluoride, polyvinylidene fluoride, and copolymers and blends thereof.

Exemplary fluoropolymers include homopolymers and copolymers of polychlorotrifluoroethylene. Particularly preferred are PCTFE (polychlorotrifluoroethylene homopolymer) materials sold under the ACLON™ trademark and which are commercially available from Honeywell International Inc. of Morristown, N.J. The most preferred fluoropolymers or fluorocarbon resins include fluorocarbon-modified polymers, particularly fluoro-oligomers and fluoropolymers formed by grafting, condensing or reacting fluorocarbon side-chains onto, or copolymerizing fluorocarbon side chain-containing monomers (such as perfluorooctanoic acrylate) into, conventional polyethers (i.e., fluorocarbon-modified polyethers), polyesters (i.e., fluorocarbon-modified polyesters), polyanions (i.e., fluorocarbon-modified polyanions), polyacrylic acid (i.e., fluorocarbon-modified polyacrylic acid), polyacrylates (i.e., fluorocarbon-modified polyacrylates), or polyurethanes (i.e., fluorocarbon-modified polyurethanes). One particularly preferred fluorocarbon resin is NUVA®TTHU, a perfluoroalkyl acrylic copolymerizate commercially available from Clariant International, Ltd. of Switzerland. These fluorocarbon side chains or perfluoro compounds are generally produced by a telomerization process and are referred to as $C_8$ fluorocarbons. For example, a fluoropolymer or fluorocarbon resin may be derived from the telomerization of an unsaturated fluoro-compound, to form a fluorotelomer. The fluorotelomer is further modified to allow reaction with a polyether, polyester, polyanion, polyacrylic acid, polyacrylate or polyurethane, and then the fluorotelomer is grafted onto a polyether, polyester, polyanion, polyacrylic acid, polyacrylate or polyurethane. Fluorocarbon resins may also be produced, for example, by the copolymerization of a fluorocarbon side chain-containing monomer with a conventional monomer, such as an oligomer formed by the copolymerization of butyl acrylate or ethyl acrylate and perfluorooctanoic acrylate. Representative examples of these fluorocarbon-containing polymers are NUVA® fluoropolymer products, commercially available from Clariant International, Ltd. of Switzerland. Other fluorocarbon resins, fluoro-oligomers and fluoropolymers having perfluoro acid-based, perfluoro acrylate-based and perfluoro alcohol-based side chains are also useful. Fluoropolymers and fluorocarbon resins having fluorocarbon side chains of shorter lengths, such as $C_6$, $C_4$, or $C_2$, are also suitable. These include POLYFOX™ fluorochemicals, commercially available from Omnova Solutions, Inc. of Fairlawn, Ohio. Generally, but not necessarily, the fluorocarbon-containing component and nitrile rubber component are both wet (i.e., in the molten or liquid state, dispersed or dissolved) when they are blended to facilitate their miscibility and blendability, and are applied to the fibers as a wet blend.

While fluoropolymers and fluorocarbon resins increase the environmental bather properties, they tend to lack optimal processability and flexibility properties, as well as other physical properties generally considered useful in ballistic resistant composites. These important properties are provided by the nitrile rubber component, and together they produce a superior resin matrix material.

In a blend, the proportion of the nitrile rubber component to the fluorine-containing component should be set to allow the physical properties of the blended matrix composition to be dominated by the physical properties of the nitrile rubber component. At a minimum, the nitrile rubber component should be in excess of the fluorine-containing component(s). The physical properties of the fluorine-containing component(s) are of secondary importance. The fluorine-containing component or components will be chosen due to their ability to repel water and gasoline, as well as their ability to be compounded into a stable or useful blended emulsion/dispersion with the nitrile rubber component.

In representative embodiments, the fluorine-containing component comprises from about 1% by weight to about 50% by weight of the nitrile rubber polymer, when used as the resin matrix for fibers of either the felt material or of the fibrous layers of one or both of the non-woven fabrics. More preferably, the fluorine-containing component comprises from about 3% to about 35%, preferably from about 5% to about 25%, more preferably from about 5% to about 20% by weight, of the nitrile rubber polymer. The nitrile rubber dispersions used to produce the polymer composition preferably have a solids content from about 30% to about 50%, although values outside this range are possible. The fluorocarbon resin dispersions used to produce the polymer composition preferably have a solids content from about 8% to about 30%, but values outside this range are also possible. A dry resin including a fluoropolymer/fluorocarbon resin preferably includes a fluoropolymer/fluorocarbon resin solids content of from about 8% to about 12%, solids-on-solids. For example, a blend including 85% of a nitrile rubber dispersion (at 40% solids) and 15% of a fluorocarbon resin dispersion (at 25% solids), would include 9.93% of dry fluorocarbon resin if dried to form a dry blend.

Nitrile rubber polymers comprising a blend of at least one fluorine-containing material and at least one nitrile rubber terpolymer are particularly useful. When such blends are formed no reaction takes place between the nitrile rubber polymer and the fluoropolymer/fluorocarbon resin and a copolymer is not formed. It is only a physical blend. The nitrile rubber terpolymer is a copolymer made from three different monomers: an acrylonitrile monomer component, a diene monomer component and a third monomer component. The diene monomer component preferably comprises butadiene. The third monomer component is preferably a self-crosslinking monomer and preferably comprises a carboxylic acid or an ester of an unsaturated carboxylic acid. Useful self-crosslinking monomers are disclosed, for example, in U.S. Pat. No. 5,783,625. More particularly, useful examples for the third monomer component non-exclusively include N-methylolacrylamide, N-methylolmethacrylamide, N,N'-dimethylolacrylamide, N,N'-dimethylolmethacrylamide, acrylamide, methacrylamide, N-methoxymethylacrylamide, N-methoxymethylmethacrylamide, N-ethoxymethylacrylamide N-ethoxymethylmethacrylamide, N-butoxymethylacrylamide, N-butoxymethylmethacrylamide and N,N'-methylene-bisacrylamide, N-(anilinophenyl)acrylamide, N-(anilinophenyl)methacrylamide, N-(anilinophenyl)cinnamamide, N-(anilinophenyl)crotonamide, N-(anilinophenyl)amino-2-hydroxypropyl allyl ether, N-(anilinophenyl) amino-2-hydroxypropyl methallyl ether, 5-N-(4-anilinophenyl)amino-2-hydroxypentyl acrylate and 5-N-(4-anilinophenyl)amino-2-hydroxypentyl methacrylate. Also useful are methyl acrylate, methyl methacrylate, ethyl acrylate, ethyl methacrylate, butyl acrylate, butyl methacrylate, 2-ethylhexyl acrylate, 2-ethylhexyl methacrylate, trifluoroethyl acrylate, trifluoroethyl methacrylate, tetrafluoropropyl acrylate, tetrafluoropropyl methacrylate, ethyl itaconate, butyl fumarate, butyl maleate, methoxymethyl acrylate, methoxymethyl methacrylate, ethoxyethyl acrylate, ethoxyethyl methacrylate, methoxyethoxyethyl acrylate and methoxyethoxyethyl methacrylate; cyanoalkyl esters of acrylic acid and methacrylic acid such as cyanomethyl acrylate, cyanomethyl methacrylate, 2-cyanoethyl acrylate, 2-cyanoethyl methacrylate, 1-cyanopropyl acrylate, 1-cyanopropyl methacrylate, 2-ethyl-6-cyanohexyl acrylate, 2-ethyl-6-cyanohexyl methacrylate, 3-cyanopropyl acrylate and 3-cyanopropyl methacrylate; fluoroalkyl vinyl ethers such as fluoroethyl vinyl ether; and vinylpyridine.

The nitrile rubber terpolymer component of this particular nitrile rubber/fluoropolymer (fluorocarbon), as a nitrile rubber polymer, preferably has an acrylonitrile content of from about 15% to about 50%, more preferably from about 15% to about 40%, and most preferably from about 15% to about 30% by weight. The nitrile rubber terpolymer component preferably has a butadiene content of from about 40% to about 84.9%, more preferably from about 55% to about 84.5% and most preferably from about 66% to about 83% by weight. The nitrile rubber terpolymer component preferably includes from about 0.1% to about 10%, more preferably from about 0.5% to about 5% and most preferably from about 2% to about 4% by weight of the third monomer component.

Most preferably the nitrile rubber terpolymer comprises a terpolymer formed from an acrylonitrile monomer component, a butadiene monomer component and either N-methylol acrylamide or a carboxylic acid monomer component. A most preferred nitrile rubber terpolymer comprises carboxylated nitrile rubber. The nitrile rubber terpolymer component preferably comprises from about 60% to about 99%, more preferably from about 75% to about 97%, and most preferably from about 85% to about 95% by weight of the nitrile rubber polymer. Accordingly, the fluorine-containing component preferably comprises from about 1% to about 40%, more preferably from about 3% to about 25% and most preferably from about 5% to about 15%, by weight, solids-on-solids. Useful fluorine-containing materials are described above.

The nitrile rubber polymer, when used as a resin matrix, preferably further comprises at least one surfactant. The addition of a surfactant to the polymer achieves improved uniformity of coating on the individual fibers. It has also been found that the addition of a surfactant increases the stability of a blended dispersion and promotes the uniformity of the distribution of a fluorocarbon resin, if present, at the air-to-rubber polymer and fiber-to-rubber polymer interfaces of a nitrile rubber/fluorocarbon resin blend. The surfactant may be included whether the fluoropolymer is present or not. Suitable surfactants non-exclusively include anionic, cationic, amphoteric and non-ionic surfactants. Generally, non-ionic surfactants are preferred because they have the most limited solubility in water and do not form salts with anionic surfactants. Further, the nitrile rubber polymers are very sensitive to anionic and cationic surfactants because the high charge density may lead to coagulation of the dispersions. Non-ionic surfactants typically do not interfere with the nature of the dispersed polymers (micelles containing solids), or exhibit minimal interference. Preferred non-ionic surfactants include non-ionic surfactants based on fatty acids and fatty alcohols, particularly those having hydrophile-lipophile balance (HLB) values of 7 to 10. A particularly preferred surfactant is a non-ionic polyethylene-glycol-trimethylnonyl-ether, such as TERGITOL®TMN-3 surfactant commercially available from Dow Chemical Company of Midland, Mich. TERGITOL®TMN-3 is preferred because it provides a low surface tension at a low concentration. Low surface tension is desired to make sure the dispersion spreads well and covers each individual fiber. TERGITOL®TMN-3 has an HLB value of approximately 8 and exhibits carbon chain branching that helps reducing surface tension. Also useful are non-ionic fluorosurfactants, such as FLUOWET® fluorosurfactants from Clariant GmbH Corporation of Germany, particularly FLUOWET®OTN. However, fluorosurfactants may not be acceptable due to environmental concerns. Also useful are silicone surfactants in combination with ethoxylated castor oils that are partially end-capped with oleic acid.

In a preferred embodiment, a surfactant is present and comprises from about 0.01% to about 10%, more preferably from about 0.05% to about 5%, and most preferably from about 0.1% to about 2.5%, by weight of the nitrile rubber polymer. Any of the resin matrix materials discussed above may be compounded with fillers such as carbon black, silica, etc. and may be extended with oils and vulcanized by sulfur, peroxide, metal oxide or radiation cure systems using methods well known to rubber technologists. Blends of different resins may also be used as the resin matrix.

Coating/Impregnation of the Resin Matrix

According to representative embodiments, each of the plurality of fibrous layers of the non-woven fabrics is coated or impregnated with the resin matrix prior to consolidation, so as to form corresponding, non-woven prepreg fabrics. Likewise, the fibers of the felt material may similarly be coated or impregnated with a resin matrix, such as a nitrile rubber polymer discussed above, to form a separate felt prepreg fabric. The fibrous layers of the non-woven fabrics or the fibers of the felt material may therefore be formed by constructing a fiber network initially and then coating the network with the matrix composition. As used herein, the term "coating" is used in a broad sense to refer to a fiber network wherein the individual fibers either have a continuous layer of the matrix composition surrounding the fibers or a discontinuous layer of the matrix composition on the surface of the fibers. In the former case, it can be said that the fibers are fully embedded in the matrix composition. The terms coating and impregnating are used interchangeably. Although it is possible to apply the resin matrix to resin-free fibers just prior to consolidation of the fabrics and felt, this may be less desirable since the uniformity of the resin coating may be difficult to control.

The resin matrix composition may be applied in any suitable manner, such as a solution, dispersion or emulsion, onto fibers of either the non-woven fabrics having fibrous layers or the felt material. In either case, the matrix-coated fiber network is then dried. The solution, dispersion or emulsion of the resin matrix may be sprayed onto the filaments. Alternatively, the fibers may be coated with the aqueous solution, dispersion or emulsion by dipping or by means of a roll coater or the like. After coating, the resulting coated fiber network may then be passed through an oven for drying in which the coated fibers are subjected to sufficient heat to evaporate the water or other liquid in the matrix composition. The dried, coated fiber network may then be placed on a carrier web, which can be a paper or a film substrate. Otherwise, the fibers may initially be placed on a carrier web before coating with the resin matrix. In either case, the substrate and the coated fiber network comprising one or more fiber layers can then be wound up into a continuous roll in a known manner.

In the case of unidirectionally aligned fiber networks, for example used in the non-woven fabrics, yarn bundles of the high tenacity filaments may be supplied from a creel and led through guides and one or more spreader bars into a collimating comb prior to coating with the matrix material. The collimating comb aligns the filaments substantially unidirectionally and substantially in the same plane.

Laminating Film Layers

According to optional embodiments, the high tenacity fibers of the felt material may be laminated with laminating film layers on one or both opposing surfaces. This provides, in the consolidated, layered composite, (i) a first laminating film layer between the first non-woven fabric and the felt material and/or (ii) a second laminating film layer between the felt material and the second non-woven fabric. In a representative embodiment, therefore, the felt material may comprise a single felt layer disposed between two laminating film layers. Alternatively, the felt material may comprise a plurality of felt layers separated by felt laminating layers, with each of the plurality of felt layers being disposed between first and second laminating film layers. In the case of a plurality of felt layers, a single type of high tenacity fiber may be used in each layer, or different fibers may be used, for example a polyolefin fiber in a first felt layer and an aramid fiber in a second felt layer. Otherwise, a high tenacity fiber may be used in one felt layer and another type of fiber used in a second felt layer.

Laminating of the felt material may be carried out by mating it with one or two laminating film layers on one or both of its opposing surfaces under heat and pressure sufficient to bond the laminating film layer(s) to the felt surface(s) and to compress the felt. Suitable plastic films for use in the laminating film layer(s), as well as the felt laminating layer(s) described above, are selected from the group consisting of polyolefin, polyamide, polycarbonate, ionomer, polyimide, polyvinyl chloride, polyester and polyurethane films. Preferably, the plastic film is polyethylene, polyamide, polycarbonate, ionomer or polyester. Preferably, the one or more laminating film layers have a thickness from about 8 μm (0.3 mils) to about 1 mm (39 mils), and more preferably from about 8 μm (0.3 mils) to about 500 μm (20 mils).

Optionally, a bonding agent is applied to either the felt, the laminating film layer(s), and/or the felt laminating layer(s) before mating the felt with these film layer(s). Therefore, according to optional embodiments, a bonding agent may be present in the composite at one or more felt material/laminating film interfaces, one or more felt material/felt laminating interfaces and/or one or more non-woven fabric/laminating film interfaces, whether or not laminating film layers are disposed on opposing surfaces of a single felt layer or between a plurality of felt layers, as described above. The bonding agent, if used, may be applied as a solution, a melt or as a solid film. When a bonding agent is present, it is present in an amount from about 1% to about 10% of the felt material (i.e., the weight of high tenacity fibers, the resin matrix (if used), the laminating film layer, and the bonding agent). Preferably, the bonding agent is an elastomeric material having a tensile modulus less than about 41.4 MPa (6,000 psi) as measured by ASTM D638-03. A wide variety of elastomeric materials and formulations having appropriately low modulus may be utilized as a bonding agent. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, copolymers of ethylene. Preferably, the bonding agent is a tri-block copolymer of a vinyl aromatic monomer and a conjugated diene elastomer, as produced commercially by Kraton Polymers Inc.

Suitable pressures for laminating the felt material are from about 0.690 MPa to about 34.5 MPa (about 100 to about 5000 psi). The laminating temperature when no bonding agent is present is selected with respect to the softening point of the laminating film layer and/or the melting points of the high tenacity fibers. When the felt includes high strength polyethylene fibers, the laminating temperature is preferably from about 100° C. (212° F.) to about 130° C. (266° F.). When the felt contains only fibers melting above the melting point of the plastic film, then the laminating temperature is preferably from about 100° C. (212° F.) to the softening point of the laminating film layer. The felt sheet is therefore laminated at a temperature that is either below the melting point of the high strength fibers of the felt sheet or below the softening point of the plastic film.

The softening point of a bonding agent should be at a lower temperature than the softening point of the laminating film layer(s) (or felt laminating layer(s)) or the melting point of the high strength fibers. When a bonding agent is present, the laminating temperature is from about the softening point of the bonding agent to about the softening point of the laminating film layer or to about 20° C. (36° F.) below the melting point of the lowest melting high strength fiber, whichever is lower. The laminating operation bonds the plastic film to the felt and compresses the felt, making it more compact and dense. Preferably, the combination of the felt material, laminating film layer(s), and optionally the felt laminating layer(s), has a density of from about 0.05 g/cm$^3$ (3 lb/ft$^3$) to about 1.5 g/cm$^3$ (94 lb/ft$^3$) and more preferably, from about 0.1 g/cm$^3$ (6 lb/ft$^3$) to 1.5 g/cm$^3$ (94 lb/ft$^3$). Preferably, this combination has an areal density of from about 0.1 kg/m$^2$ (0.02 lb/ft$^2$) to about 2 kg/m$^2$ (0.4 lb/ft$^2$).

The felt material, which may include one or more felt layers, may comprise, in addition to high tenacity fibers and optional laminating film layers, a resin matrix as discussed above (e.g., comprising a thermoplastic resin, a thermosetting resin, or a hybrid resin) that is present in amounts as discussed above.

Consolidation

The fibrous layers used in the non-woven fabrics or otherwise the fibers of the felt material, any of which are optionally coated/impregnated with a resin matrix, as discussed above, to form coated fibrous networks (e.g., as non-woven prepreg fabrics comprising fibrous layers of unidirectionally oriented high tenacity fibers or felt prepreg fabrics that may be laminated, as described above), are consolidated. By "consolidating" is meant that the fibrous layers, fibers, and/or coated and/or laminated fiber networks (as prepregs) are combined to form the consolidated, layered composite. Consolidation can occur via drying, cooling, heating, pressure or a combination thereof. Representative consolidation methods include the use of a heated nip roll to provide both the temperature and pressure for carrying out the consolidation. If the non-woven fabrics and/or felt material are not made into prepregs, then the fibers of the felt material and of the fibrous layers of the non-woven fabrics may be substantially coated with a low modulus elastomeric matrix composition on all fiber surfaces. Thereafter, the fiber layers are preferably consolidated to form the layered composite.

Consolidation may therefore be achieved by stacking the individual fibrous layers of the non-woven fabrics and felt material, or otherwise coated or impregnated prepregs having these layers, followed by bonding them together under heat and pressure to heat set the overall structure, causing the matrix material to flow and occupy any remaining void spaces. As discussed above, individual fibrous layers of the non-woven fabrics may be cross-plied to achieve excellent ballistic resistance such that the fiber alignment direction of one layer is rotated at an angle with respect to the fiber alignment direction of another layer (i.e., the layers are non-parallel). For example, a preferred structure has two fiber layers positioned together such that the longitudinal fiber direction of one layer is perpendicular to (extends in a direction of 90° relative to) the longitudinal fiber direction of the other layer. As discussed above, the perpendicular orientation also applies to fiber layers adjacent to opposing surfaces of the felt material.

Suitable bonding for consolidating the fiber layers may be achieved at a temperature from about 93° C. (200° F.) to about 177° C. (350° F.), more preferably from about 93° C. (200° F.) to about 149° C. (300° F.), and most preferably at a temperature from about 93° C. (200° F.) to about 121° C. (250° F.) and at a pressure from about 172 kPa (25 psi) to about 3447 kPa (500 psi), although higher pressures may be used. The consolidation may be conducted in an autoclave.

When heating, it is possible that the resin matrix can be caused to stick or flow without completely melting. However, generally, if the resin matrix is caused to melt, relatively little pressure is required to form the composite, while if the resin matrix is only heated to a sticking point, more pressure is typically required. The time period for which the consolidation temperatures and pressures are held generally varies from about 10 seconds to about 24 hours, typically from about 5 minutes to about 3 hours, and often from about 10 minutes to about 2 hours However, the consolidation temperatures, pressures and times are generally dependent on the content(s) and type(s) of resin matrix, as well as the content(s) and type(s) of fiber(s).

Accordingly, consolidated, layered composites will have a preferred thickness of from about 25 μm (0.98 mils) to about 500 μm (20 mils) per fibrous layer of the high tenacity fibrous layers used in both the first and second non-woven fabrics, and more preferably from about 75 μm (3.0 mils) to about 385 μm (15 mils) per fibrous layer and most preferably from about 125 μm (4.9 mils) to about 255 μm (10 mils) per fibrous layer.

The felt material adds additional thickness to the composite, and preferably from about 500 μm (20 mils) to about 5 mm (0.2 inches) per felt layer (e.g., with the possibility of having multiple felt layers separated by laminating layers, as discussed above) in the felt material. Consolidation generally compresses the felt, making it more compact and dense, relative to the condition of the felt prior to consolidation. While such thicknesses are preferred, it is to be understood that other layer thicknesses may be produced to satisfy a particular need and yet fall within the scope of the present invention.

The areal density of each layer preferably may range from about 0.034 kg/m$^2$ (0.0070 lb/ft$^2$) to about 3.1 kg/m$^2$ (0.63 lb/ft$^2$), more preferably from about 0.17 kg/m$^2$ (0.035 lb/ft$^2$) to about 2.2 kg/m$^2$ (0.45 lb/ft$^2$), and most preferably from about 0.17 kg/m$^2$ (0.035 lb/ft$^2$) to about 0.85 kg/m$^2$ (0.17 lb/ft$^2$). The thicknesses and areal densities of each of the fibrous layers of the first and/or second non-woven fabric(s) may be the same or different.

Composite Properties

The consolidated, layered composites have a number of desirable properties for use in military, law enforcement, and other applications in which a high degree of protection of the user is required. For example, the ballistic shield composites described herein are resistant to, or capable of preventing penetration of, bullets such as rifle bullets and fragments having energy levels of at least about 400 joules (295 ft-lb), more preferably from about 400 (295 ft-lb) to about 4000 joules (2950 ft-lb), and most preferably from about 800 joules (590 ft-lb) to about 3000 joules (2200 ft-lb). In addition to bullet and fragment penetration resistance, the composites are advantageously light weight and resist absorption of both water and organic liquids such as gasoline, diesel, and other petroleum, oil, and lubricant (POL) materials encountered in military operation. Water/hydrocarbon resistance may be further improved by covering the composite with a plastic cover, although this is generally not necessary in embodiments using a water and lubrication resistant resin (e.g., a nitrile rubber polymer as discussed above) as a resin matrix for the felt material and/or fibrous layers of the non-woven fabrics.

The total layered composite thickness is advantageously less than about 12 mm (0.47 in) (e.g., in the range from about 4 mm (0.16 in) to about 12 mm (0.47 in)), and normally less than about 10 mm (0.39 in) (e.g., in the range from about 4 mm (0.16 in) to about 10 mm (0.39 in)). The total areal density of the layered composite is advantageously less than about 29.3 kg/m$^2$ (6 lb/ft$^2$) (e.g., in the range from about 4.89 kg/m$^2$ (1 lb/ft) to about 29.3 kg/m$^2$ (6 lb/ft$^2$)), and normally less than about 24.4 kg/m$^2$ (5 lb/ft$^2$) (e.g., in the range from about 9.77 kg/m$^2$ (2 lb/ft$^2$) to about 24.4 kg/m$^2$ (5 lb/ft$^2$)).

Formation of Articles

After formation of the layered composites, they may be used in various applications. For example, they may be molded into articles by subjecting them to heat and pressure. Temperatures for molding may generally range from about 20° C. (68° F.) to about 175° C. (347° F.), typically from about 100° C. (212° F.) to about 150° C. (302° F.), and often from about 110° C. (230° F.) to about 130° C. (266° F.). Suitable techniques for forming articles described in, for example, U.S. Pat. No. 4,623,574; U.S. Pat. No. 4,650,710; U.S. Pat. No. 4,748,064; U.S. Pat. No. 5,552,208; U.S. Pat. No. 5,587,230; U.S. Pat. No. 6,642,159; U.S. Pat. No. 6,841,492; and U.S. Pat. No. 6,846,758.

According to a representative forming method, a plurality of layered composites are arranged together to form flexible articles, including garments such as vests, pants, hats, or other articles of clothing. The layered composites may also be formed into other personal protective articles such as helmets, or may be formed into protective barriers, covers, or blankets, as desired. The fiber networks of the first and second non-woven fabrics and the felt layer may individually retain the high flexibility characteristic of textile fabrics while preferably remaining separate (i.e., not bonded together). Alternately, fabrics and/or the felt layer(s) may be stitched together or bonded together with adhesive materials or other thermoplastic or non-thermoplastic fibers or materials. Accordingly, articles of the invention may comprise a plurality of non-woven, fragment resistant fabrics that are assembled into a bonded or non-bonded array.

Garments of the invention may be formed through methods conventionally known in the art. Preferably, a garment may be formed by adjoining the bullet and fragment resistant layered composites of the invention with an article of clothing. For example, a bullet and fragment resistant vest may comprise a generic fabric vest that is adjoined with one or more layered composites as described herein. The term "adjoining" includes physically attaching, for example by sewing or adhering and the like, as well as coupling or juxtaposition without physically attaching, such that the layered composite may optionally be easily removable from the vest or other article of clothing. The layered composite may be inserted into strategically placed pockets. This allows for a desired degree of protection without excessive weight of the vest.

Vests and other articles of clothing comprising multiple layered composites described herein have good flexibility and comfort, coupled with excellent ballistic protection and fragment resistance. A small pointed projectile can penetrate armor by laterally displacing fibers without breaking them. In this case, the penetration resistance depends on how readily fibers may be pushed aside, and therefore, on the nature of the fiber network. Important factors in the ballistic or fragment resistance of a composite comprising non-woven fabrics is the periodicity of cross-overs in cross-plied fibrous layers, fiber denier, fiber-to-fiber friction, matrix characteristics, inter-laminar bond strengths, and others.

A representative layered composite is depicted in the FIGURE. As shown in this embodiment, layered composite 100 comprises a felt material 2 comprising high tenacity felt fibers. For high resistance to water as well as petroleum, oil, and lubricant (POL), a nitrile rubber polymer as a resin matrix is disposed on felt material 2 in an amount from about 2% to about 50% of the combined weight of the resin matrix and felt material. Layered composite 100 further comprises first and second non-woven fabrics 1,3 adjacent each opposing lateral surface of the felt material 2.

In this representative embodiment, the first and second non-woven fabrics 1,3 may each comprise a plurality of high tenacity fibrous layers in a cross-ply arrangement of unidirectionally oriented fibers, with adjacent layers of fibers in one or both fabrics extending in a direction of 90° relative to one another. First and second non-woven fabrics, according to preferred embodiments, therefore include SPECTRA SHIELD®, having 2-4 layers of unidirectionally oriented SPECTRA® fiber, as discussed above, with adjacent layers being cross-plied at 90° relative to one another. Otherwise, one or both of the first and second non-woven fabrics may comprise only a single fibrous layer, and this single layer may be in a cross-ply arrangement with respect to a layer of the other non-woven fabric adjacent the opposing lateral surface of the felt material that is between the non-woven fabrics. The felt material 2 and the non-woven fabrics 1,3 are consolidated at facing lateral surfaces A,B. In alternative embodiments, laminating layers (not shown) may be incorporated between the first non-woven fabric 1 and felt material 2 and also between felt material 2 and second non-woven fabric 3. A heated nip roll may be used obtain a suitable temperature and pressure for carrying out the consolidation.

Overall aspects of the present invention are associated with consolidated, layered composites having a least one layer of a fragment resistant fabric, such as a felt material, in combination with surrounding bullet resistant fabrics such as those comprising cross-plied fibrous layers of unidirectional high tenacity fibers (e.g., high molecular weight polyethylene fibers). The overall layered composite is used for lightweight and flexible (and therefore comfortable) articles affording a high degree of protection to the wearer or user. Those having skill in the art, with the knowledge gained from the present disclosure, will recognize that various changes can be made in these layered composites, and methods for making them, without departing from the scope of the present disclosure. The subject matter described herein is therefore representative of the present invention and its associated advantages and is not to be construed as limiting the scope of the invention as set forth in the appended claims.

The invention claimed is:

1. A consolidated, layered composite having high penetration resistance to both bullets and fragments, comprising, in order:
    (a) a first non-woven fabric comprising one or more unidirectionally oriented high tenacity fibrous layers,
    (b) a felt material comprising high tenacity felt fibers, and
    (c) a second non-woven fabric comprising one or more unidirectionally oriented high tenacity fibrous layer.

2. The composite of claim 1, wherein the fibrous layers of the first and second non-woven fabrics comprise high tenacity fibers in a resin matrix.

3. The composite of claim 2, wherein the resin matrix of the first and second non-woven fabrics independently comprises a resin selected from the group consisting of a thermoplastic resin, a thermosetting resin, and a hybrid resin.

4. The composite of claim 3, wherein the resin matrix of the first and second non-woven fabrics is present in an amount from about 5% to about 40% by weight of the first and second non-woven fabrics, respectively.

5. The composite of claim 2, wherein the high tenacity fibers of the first and second non-woven fabrics independently comprise polyolefin fibers or aramid fibers.

6. The composite of claim 5, wherein the high tenacity fibers of both the first and the second non-woven fabrics comprise polyethylene fibers.

7. The composite of claim 6, wherein the plurality fibrous layers of both the first and second non-woven fabrics are in a cross-ply arrangement of unidirectionally oriented fibers with adjacent layers of fibers extending in a direction of 90° relative to one another.

8. The composite of claim 7, wherein the first and second non-woven fabrics comprise from 2 to 8 fibrous layers.

9. The composite of claim 1, further comprising a nitrile rubber polymer disposed on the high tenacity fibers of the felt material.

10. The composite of claim 9, wherein the nitrile rubber polymer is present in the felt material in an amount from about 2% to about 50% by weight.

11. The composite of claim 1, further comprising (i) a first laminating film layer between the first non-woven fabric and the felt material and (ii) a second laminating film layer between the felt material and the second non-woven fabric, wherein the first and second laminating film layers are each present in an amount of from about 5% to about 25% by weight of the felt material.

12. The composite of claim 11, wherein the felt material comprises a single felt layer disposed between the first and second laminating film layers.

13. The composite of claim 11, wherein the felt material comprises a plurality of felt layers separated by felt laminating layers, wherein the plurality of layers is disposed between the first and second laminating film layers.

14. The composite of claim 1, wherein the composite is resistant to a rifle bullet having an energy from about 400 J (295 ft-lb) to about 4000 J (2950 ft-lb) and a fragment having an energy from about 400 J (295 ft-lb) to about 4000 J (2950 ft-lb).

15. The composite of claim 1, having a total thickness of less than about 12 mm (0.47 in) and a total areal density of less than about 8 lb/ft$^2$ (39.2 kg/m$^2$).

16. A vest having high penetration resistance to both bullets and fragments comprising the composite of claim 1.

17. A method of making a layered composite, the method comprising consolidating
  (a) a first non-woven fabric comprising one or more unidirectionally oriented high tenacity fibrous layers,
  (b) a felt material comprising high tenacity felt fibers,
  (c) a second non-woven fabric comprising one or more unidirectionally oriented high tenacity fibrous layers,
optionally together with a laminating film layer between (a) and (b) and/or a laminating film layer between (b) and (c), to provide the layered composite.

18. The method of claim 17, wherein the consolidating occurs at a temperature in the range from about 75° C. to about 150° C. and a pressure in the range from about 1 barg (15 psig) to about 14 barg (203 psig).

19. The method of claim 17 wherein, during the consolidating, the felt material is compressed and has a thickness, in the layered composite, that is reduced by at least about 10%, relative to an initial thickness prior to consolidating.

20. An article having high penetration resistance to both bullets and fragments, the article comprising a consolidated, layered composite comprising a felt material comprising high tenacity felt fibers having a nitrile rubber polymer disposed thereon in an amount from about 2% to about 50% by weight, and further comprising first and second non-woven fabrics adjacent each opposing lateral surface of the felt material,
  wherein the first and second non-woven fabrics each comprise one or more high tenacity fibrous layers in a crossply arrangement of unidirectionally oriented fibers with adjacent layers of fibers extending in a direction of 90° relative to one another, wherein the felt material and non-woven fabrics are consolidated at facing lateral surfaces.

\* \* \* \* \*